United States Patent
Matsukawa et al.

(10) Patent No.: US 8,340,956 B2
(45) Date of Patent: Dec. 25, 2012

(54) INFORMATION PROVISION SYSTEM, INFORMATION PROVISION METHOD, INFORMATION PROVISION PROGRAM, AND INFORMATION PROVISION PROGRAM RECORDING MEDIUM

(75) Inventors: Yoshiko Matsukawa, Minato-ku (JP); Shinichi Doi, Minato-ku (JP)

(73) Assignee: NEC Corporation, Tokyo (JP)

( * ) Notice: Subject to any disclaimer, the term of this patent is extended or adjusted under 35 U.S.C. 154(b) by 1064 days.

(21) Appl. No.: 12/302,698

(22) PCT Filed: May 23, 2007

(86) PCT No.: PCT/JP2007/060490
§ 371 (c)(1),
(2), (4) Date: Nov. 26, 2008

(87) PCT Pub. No.: WO2007/138944
PCT Pub. Date: Dec. 6, 2007

(65) Prior Publication Data
US 2009/0287469 A1      Nov. 19, 2009

(30) Foreign Application Priority Data
May 26, 2006   (JP) .................................. 2006-147096

(51) Int. Cl.
*G06F 17/27* (2006.01)

(52) U.S. Cl. ................... 704/9; 704/1; 704/10; 704/258

(58) Field of Classification Search .................. 704/1, 9, 704/10, 258
See application file for complete search history.

(56) References Cited

U.S. PATENT DOCUMENTS
4,931,934 A * 6/1990 Snyder ............................ 434/236
5,860,064 A * 1/1999 Henton .......................... 704/260
(Continued)

FOREIGN PATENT DOCUMENTS
JP          05-100692 A          4/1993
(Continued)

OTHER PUBLICATIONS
Nicholls, Emotify=Automatic Emotion Markup of Children Stgories with VHML, 169 article(nicholls2001emotify), 2001, pp. 1-49.*
(Continued)

Primary Examiner — Richemond Dorvil
Assistant Examiner — Lamont Spooner
(74) Attorney, Agent, or Firm — Sughrue Mion, PLLC

(57) ABSTRACT

An information provision system capable of providing attribute information to a contextually appropriate portion as well as a linguistic unit including a specific character string expression is provided. The information provision system includes analysis means 21 for dividing a linguistic expression into predetermined linguistic units, a dictionary 31 for extracting vocabularies each of which determines attribute information and selecting a linguistic unit to which the attribute information is to be provided, attribute information determination means (first attribute information determination means) 22 for extracting a predetermined vocabulary from the linguistic unit and determining the attribute information using the dictionary, and attribute information provision linguistic unit selection means (second attribute information determination means) 23 for determining the attribute information on an adjacent linguistic unit, based on the attribute information determined by the first attribute information determination means 22 and a connecting relationship between the respective linguistic units.

18 Claims, 10 Drawing Sheets

U.S. PATENT DOCUMENTS

| | | | |
|---|---|---|---|
| 5,983,184 A * | 11/1999 | Noguchi | 704/270 |
| 7,360,151 B1 * | 4/2008 | Froloff | 715/255 |
| 7,434,176 B1 * | 10/2008 | Froloff | 715/839 |
| 7,720,784 B1 * | 5/2010 | Froloff | 706/47 |
| 7,853,863 B2 * | 12/2010 | Sakai | 715/200 |
| 7,949,109 B2 * | 5/2011 | Ostermann et al. | 379/100.08 |
| 7,953,601 B2 * | 5/2011 | Pickering | 704/260 |
| 7,983,910 B2 * | 7/2011 | Subramanian et al. | 704/250 |
| 8,065,150 B2 * | 11/2011 | Eide | 704/258 |
| 2001/0042057 A1 * | 11/2001 | Ikebe et al. | 706/11 |
| 2002/0188449 A1 * | 12/2002 | Nukaga et al. | 704/258 |
| 2002/0194006 A1 * | 12/2002 | Challapali | 704/276 |
| 2003/0055654 A1 * | 3/2003 | Oudeyer | 704/275 |
| 2003/0224341 A1 * | 12/2003 | Ho et al. | 434/362 |
| 2004/0024602 A1 * | 2/2004 | Kariya | 704/270 |
| 2004/0024822 A1 * | 2/2004 | Werndorfer et al. | 709/206 |
| 2004/0107101 A1 * | 6/2004 | Eide | 704/260 |
| 2005/0065795 A1 * | 3/2005 | Mutsuno et al. | 704/260 |
| 2005/0107127 A1 * | 5/2005 | Moriya | 455/566 |
| 2006/0129927 A1 * | 6/2006 | Matsukawa | 715/532 |
| 2006/0153390 A1 * | 7/2006 | Iwaki et al. | 381/13 |
| 2006/0224386 A1 * | 10/2006 | Ikegami | 704/260 |
| 2007/0094330 A1 * | 4/2007 | Russell | 709/206 |
| 2007/0208569 A1 * | 9/2007 | Subramanian et al. | 704/270 |
| 2007/0266090 A1 * | 11/2007 | Len | 709/204 |

FOREIGN PATENT DOCUMENTS

| | | |
|---|---|---|
| JP | 05-324708 A | 12/1993 |
| JP | 08-123812 A | 5/1996 |
| JP | 2004-259238 A | 9/2004 |
| JP | 2004-272807 A | 9/2004 |
| JP | 2005-181840 A | 7/2005 |
| JP | 2005-222294 A | 8/2005 |

OTHER PUBLICATIONS

Nicholls, Automatic Emotion Markup of Children Stories with SML, @article(nicholls2001emotify), 2001.*

Liu et al., A Model of Textual Affect Sensing using Real-World Knowledge, 2003, Proceedings of the 8$^{th}$ international conference on Intelligent user interfaces, ACM, pp. 1-8.*

Valitutti et al., Developing Affective Lexical Resources, 2004, Psychology Journal, V2 No. 1, pp. 61-83.*

* cited by examiner

FIG. 5

| VOCABULARY THAT DETERMINES ATTRIBUTE INFORMATION | ATTRIBUTE INFORMATION |
|---|---|
| BE GLAD | JOY |
| ! | JOY |
| (^o^) | JOY |
| BE UPSEPT | ANGER |
| (-_-メ) | ANGER |
| SIR | POLITE |
| "MASU" * SENTENCE FINAL PARTICLE (JAPANESE) | POLITE |
| YOU | COLLOQUIAL |
| "YO" * SENTENCE FINAL PARTICLE (JAPANESE) | COLLOQUIAL |
| ASK A FAVOR | REQUEST |
| PLEASE | REQUEST |

FIG. 6

| MAJOR GROUP | MINOR GROUP | WORD EXAMPLES |
|---|---|---|
| WHEN PROVIDING SAME ATTRIBUTE INFORMATION TO ADJACENT LINGUISTIC UNITS | CAUSAL CONJUNCTION | SO ACCORDINGLY |
| | CAUSAL CONJUNCTIVE PARTICLE AT END OF SENTENCE | " NODE (SINCE...) " " KARA (BECAUSE...) " |
| | REFERENCE TERM CORRESPONDING RANGE | |
| WHEN PROVIDING DIFFERENT ATTRIBUTE INFORMATION TO ADJACENT LINGUISTIC UNITS | CONJUNCTION INDICATING CHANGEOVER | BY THE WAY NOW |
| | ADVERSATIVE CONJUNCTION | BUT HOWEVER |
| | CHANGE OF SUBJECT | |
| | CHANGE OF SENTENCE-FINAL PARTICLE | |
| | CHANGE OF AUXILIARY VERB AT END OF SENTENCE | |
| WHEN NOT PROVIDING ATTRIBUTE INFORMATION | GREETING SENTENCE | GOOD MORNING GOOD-BYE |
| | QUOTED PORTION OF ELECTRONIC MAIL | SENTENCE STARTING WITH > |

FIG. 7

GOOD MORNING~! NOW, THE TRAIN HAS STOPPED. A FATAL TRAIN ACCIDENT HAS OCCURRED. I'M QUITE UPSET, I WILL BE LATE AGAIN (-_-✘).
BY THE WAY, HOW WAS THE LAST TEST? I'VE PASSED (^o^).

FIG. 8

| SENTENCE NO. | |
|---|---|
| 1 | GOOD MORNING~! |
| 2 | NOW, THE TRAIN HAS STOPPED. |
| 3 | A FATAL TRAIN ACCIDENT HAS OCCURRED. |
| 4 | I'M QUITE UPSET, I WILL BE LATE AGAIN (-_-✘). |
| 5 | BY THE WAY, HOW WAS THE LAST TEST? |
| 6 | I'VE PASSED (^o^). |

FIG. 9

| SENTENCE NO. | | ATTRIBUTE INFORMATION |
|---|---|---|
| 1 | GOOD MORNING~! | JOY |
| 2 | NOW, THE TRAIN HAS STOPPED. | |
| 3 | A FATAL TRAIN ACCIDENT HAS OCCURRED. | |
| 4 | I'M QUITE UPSET, I WILL BE LATE AGAIN (-_-✗). | ANGER |
| 5 | BY THE WAY, HOW WAS THE LAST TEST? | |
| 6 | I'VE PASSED (^o^). | JOY |

FIG. 10

| SENTENCE NO. | | ATTRIBUTE INFORMATION |
|---|---|---|
| 1 | GOOD MORNING~! | STANDARD RHYTHM |
| 2 | NOW, THE TRAIN HAS STOPPED. | ANGER |
| 3 | A FATAL TRAIN ACCIDENT HAS OCCURRED. | ANGER |
| 4 | I'M QUITE UPSET, I WILL BE LATE AGAIN (-_-✗). | ANGER |
| 5 | BY THE WAY, HOW WAS THE LAST TEST? | JOY |
| 6 | I'VE PASSED (^o^). | JOY |

FIG. 11

| SENTENCE NO. | | ATTRIBUTE INFORMATION |
|---|---|---|
| 1 | GOOD MORNING~! | JOY |
| 2 | NOW, THE TRAIN HAS STOPPED. | NONE |
| 3 | A FATAL TRAIN ACCIDENT HAS OCCURRED. | NONE |
| 4 | I'M QUITE UPSET, I WILL BE LATE AGAIN (-_-✗). | ANGER |
| 5 | BY THE WAY, HOW WAS THE LAST TEST? | NONE |
| 6 | I'VE PASSED (ˆ₀ˆ). | JOY |

FIG. 12

| ATTRIBUTE INFORMATION | FONT |
|---|---|
| JOY | POP STYLE |
| ANGER | GOTHIC STYLE |
| POLITE | GYOUSHO STYLE* |
| COLLOQUIAL | POP STYLE |
| REQUEST | MINCHO STYLE* |

*JAPANESE FONT

FIG. 13

GOOD MORNING~! NOW, THE TRAIN HAS STOPPED. A FATAL TRAIN ACCIDENT
HAS OCCURRED. I'M QUITE UPSET, I WILL BE LATE AGAIN (-_-✗).
BY THE WAY, HOW WAS THE LAST TEST? I'VE PASSED (ˆo ˆ).

FIG. 14

☺ GOOD MORNING~! ☺ ☹ NOW, THE TRAIN HAS STOPPED. A FATAL TRAIN
ACCIDENT HAS OCCURRED. I'M QUITE UPSET, I WILL BE LATE
AGAIN (-_-✗). ☹ ☺BY THE WAY, HOW WAS THE LAST TEST?
I'VE PASSED (ˆo ˆ). ☺

FIG. 15

☺ GOOD MORNING~!
☹ NOW, THE TRAIN HAS STOPPED. A FATAL TRAIN ACCIDENT HAS OCCURRED.
   I'M QUITE UPSET, I WILL BE LATE AGAIN (-_-✗).
☺ BY THE WAY, HOW WAS THE LAST TEST? I'VE PASSED (ˆo ˆ).

INFORMATION PROVISION SYSTEM, INFORMATION PROVISION METHOD, INFORMATION PROVISION PROGRAM, AND INFORMATION PROVISION PROGRAM RECORDING MEDIUM

TECHNICAL FIELD

The present invention relates to an information provision system (including its application system), an information provision method, an information provision program, and a recording medium with the information provision program recorded thereon. More specifically, the invention relates to an information provision system, an information provision method, an information provision program, and a recording medium with the information provision program recorded thereon, capable of obtaining a text with information on an attribute indicating an emotion, a speech style, or the like included in a passage.

BACKGROUND ART

In recent years, there has been an increased request for providing to a passage information on an attribute such as an emotion, a speech style, or the like that cannot be represented just by simple arrangement of characters, thereby achieving more natural expression of the passage rather than by a plain text or a plain synthesized speech. The attribute information is herein defined to be the information capable of being utilized to enhance expressiveness of a passage when the passage is output. The attribute information does not indicate original meaning of characters included in the passage. As the attribute information, information indicating an emotion of a talker such as delight, anger, sorrow, or pleasure or a speech style of a talker such as a recitation style, a DJ (disk jockey) style may be pointed out. As a method of representing a passage using this attribute information, an aurally appealing method using voice, music, or the like and a visually appealing method using a text color, a picture, or light have been conceived. Further, a speech synthesis system that recites a passage with emotion, and a cellular phone that displays content of a received mail by one icon have been realized.

Patent Document 1 describes an example of the speech synthesis system capable of reciting a text with emotion. This conventional speech synthesis system is formed of a speech mode specifying unit, a speech control parameter storage unit, a speech control level setting unit, and a speech synthesizing unit.

The speech synthesis system in Patent Document 1 is the system that recites an entire passage according to attribute information provided to a user. More specifically, when the speech synthesis system in Patent Document 1 receives specification of an arbitrary speech mode from the user, the speech synthesis system reads out a combination of levels such as a generation speed, an intonation level and the like corresponding to the specified speech mode, from the speech control parameter storage unit. Then, in this speech synthesis system, the combination of levels that has been read out is collectively set by the speech control level setting unit, and then a synthesized voice that represents an emotion is generated by the speech synthesizing unit.

Patent Document 2 discloses a speech synthesis system in which fine attribute information is provided, thereby allowing smooth expression of an emotional transition. The speech synthesis system in Patent Document 2 is formed of a text analyzing unit, an emotional information providing unit, and an emotional information interpolating unit.

In the speech synthesis system in Patent Document 2, an input passage is divided into segments by the text analyzing unit, and emotional information is provided to a segment including a character string in which the emotional information is defined, by referring to an emotion provision rule. The emotion provision rule defines emotional information on character string expressions that express emotions. In this speech synthesis system, when different emotional information is provided to adjacent segments, interpolating emotional information that smoothly changes an emotional transition between the adjacent segments is provided to allow expression of a natural emotional change.

Patent Document 1: JP Patent Kokai Publication No. JP-A-05-100692
Patent Document 2: JP Patent Kokai Publication No. JP-P2005-181840A

DISCLOSURE OF THE INVENTION

Problem to be Solved by the Invention

Analysis of the related arts by the present invention will be provided below. The entire described contents of the Patent Document(s) or Non-patent Document(s) described above are incorporated and described herein by reference thereto.

However, the conventional arts described above have a problem that natural expression cannot be made yet. Originally, an emotion or a speech style in a passage extends over a plurality of sentences rather than being present only in a segment including a specific character string expression. Further, generally, the emotion or the speech style changes in the middle of the passage. The conventional arts described above provide attribute information based on the entire passage or presence or absence of the character string expression. Thus, a unit for providing attribute information may be too long or too short.

On contrast therewith, the speech synthesis system in Patent Document 2 can provide attribute information in a finer manner than in the speech synthesis system in Patent Document 1. However, the attribute information (emotional information) is provided only to a segment including a vocabulary registered in a dictionary (emotion providing rule).

An example where a passage of "A fatal train accident has occurred. I'm quite upset, because I will be late again (-_-ㄨ)" is recited by the speech synthesis system in Patent Document 2 will be taken, and a problem encountered by using the speech synthesis system in Patent Document 2 will be described below. When a segmentation unit (linguistic unit) is set to "one sentence", the text analyzing unit of the speech synthesis system in Patent Document 2 divides the input passage into two sentences of "A fatal traffic accident has occurred." and "I'm quite upset, because I will be late again (-_-ㄨ)."

Assume that attribute information indicating "anger" is associated with a face mark of "(-_-ㄨ)" in the emotion provision rule. Then, the speech synthesis system in Patent Document 2 provides the attribute information indicating "anger" to the second sentence of "I'm quite upset, because I will be late again (-_-ㄨ)." The speech synthesis system does not provide the attribute information to the first sentence of "A fatal train accident has occurred."

Further, an emotional interpolation process (from calmness (without emotion) to the anger) is performed between output of the first sentence of "A fatal train accident has occurred." and output of the second sentence of "I'm quite upset, because I will be late again (-_-ㄨ)", as necessary.

Basically, only the second sentence of "'I'm quite upset, because I will be late again (-_-メ)." is recited with the emotion of the anger, and the first sentence of "A fatal train accident has occurred." is recited with a standard rhythm.

However, even if the second sentence of "I'm quite upset, because I will be late again (-_-メ)." includes a stronger emotion of anger, it is natural to consider the first sentence of "A fatal train accident has occurred." also includes an emotion of anger about the reason for delay, in view of context.

A phenomenon similar to that described above may occur also when attribute information that determines a speech style is provided. In the speech synthesis system in Patent Document 2, for example, it becomes possible to recite a passage including a character string associated with attribute information on the "DJ style", in the DJ style. However, when the character string is not included in a sentence foregoing or following to the sentence, the sentence that does not include the character string cannot be recited in the DJ style, which causes a listener to greatly feel that something is wrong.

The present invention has been made in view of each situation described above. It is an object of the invention therefore to provide an information provision system, an information provision method, an information provision program, and a recording medium with the information provision program recorded thereon, capable of providing attribute information to a contextually appropriate portion, in view of not only a linguistic unit including a specific character string expression but also a relationship with the linguistic unit to which the attribute information has been provided.

Means to Solve the Problems

According to a first aspect of the present invention, there is provided an information provision system comprising:
analysis means for dividing a linguistic expression into predetermined linguistic units, using a dictionary; and
first attribute information determination means for extracting a predetermined vocabulary from the linguistic units and determining attribute information, using a dictionary;
the information provision system providing the attribute information to the linguistic expression on a linguistic unit level; wherein
the information provision system comprises:
second attribute information determination means for determining attribute information on a linguistic unit with no attribute information provided thereto, based on a connecting relationship between the respective linguistic units and the attribute information provided by the first attribute information determination means. There is also provided an information processing system that performs speech synthesis and text output using the attribute information provided by the information provision system.

According to a second aspect of the present invention, there is provided a program executed by an information provision system, the information provision system including:
analysis means for dividing a linguistic expression into predetermined linguistic units, using a dictionary; and
first attribute information determination means for extracting a predetermined vocabulary from the linguistic units and determining attribute information, using the dictionary;
the information provision system providing the attribute information to the linguistic expression on a linguistic unit level; wherein
the program causes the information provision system to function as:
second attribute information determination means for determining attribute information on a linguistic unit with no attribute information provided thereto, based on a connecting relationship between the respective linguistic units and the attribute information provided by the first attribute information determination means. There is also provided a recording medium with the program recorded thereon.

According to a third aspect of the present invention, there is provided an information provision method carried out using an information provision system, the information provision system including:
analysis means for dividing a linguistic expression into predetermined linguistic units, using a dictionary; and
first attribute information determination means for extracting a predetermined vocabulary from the linguistic units and determining attribute information, using a dictionary;
the information provision system providing the attribute information to the linguistic expression on a linguistic unit level; wherein
the information provision method includes the steps of:
determining the attribute information on a linguistic unit included in the linguistic expression by the first attribute information determination means in the information provision system; and
determining attribute information on a linguistic unit with no attribute information provided thereto, based on a connecting relationship between the respective linguistic units and the attribute information provided by the first attribute information determination means in the information provision system.

MERITORIOUS EFFECTS OF THE INVENTION

According to the present invention, contextually appropriate attribute information can be provided to a linguistic unit as well which does not include a specific character string expression associated with the attribute information. Accordingly, an entire passage can be output in a more natural manner, corresponding to an emotional flow or a speech style change in the passage.

BRIEF DESCRIPTION OF THE DRAWINGS

FIG. 5 is a table for explaining correspondence relationships between vocabularies and attribute information defined in a dictionary;

FIG. 6 is a table for explaining a concept when a connecting relationship between sentences (linguistic units) is analyzed;

FIG. 7 shows a sample passage used in explanation of exemplary embodiments of the present invention;

FIG. 8 is a table showing an example of analysis results of the input passage in FIG. 7;

FIG. 9 is a table showing a state where attribute information is provided based on vocabularies included in respective sentences in FIG. 8;

FIG. 10 is a table showing a result of providing the attribute information based on connecting relationships among sentences in FIG. 9;

FIG. 11 is a table showing a result of providing the attribute information using a conventional art (Patent Document 2);

FIG. 12 is a table for explaining correspondence relationships between attribute information and representation information defined in a representation dictionary;

FIG. 13 is a diagram showing an output example using a text display system in a second exemplary embodiment of the present invention;

FIG. 14 is a diagram showing an output example using the text display system in the second exemplary embodiment of the present invention; and FIG. 15 is a diagram showing an output example using the text display system in the second exemplary embodiment of the present invention.

Figure 1:
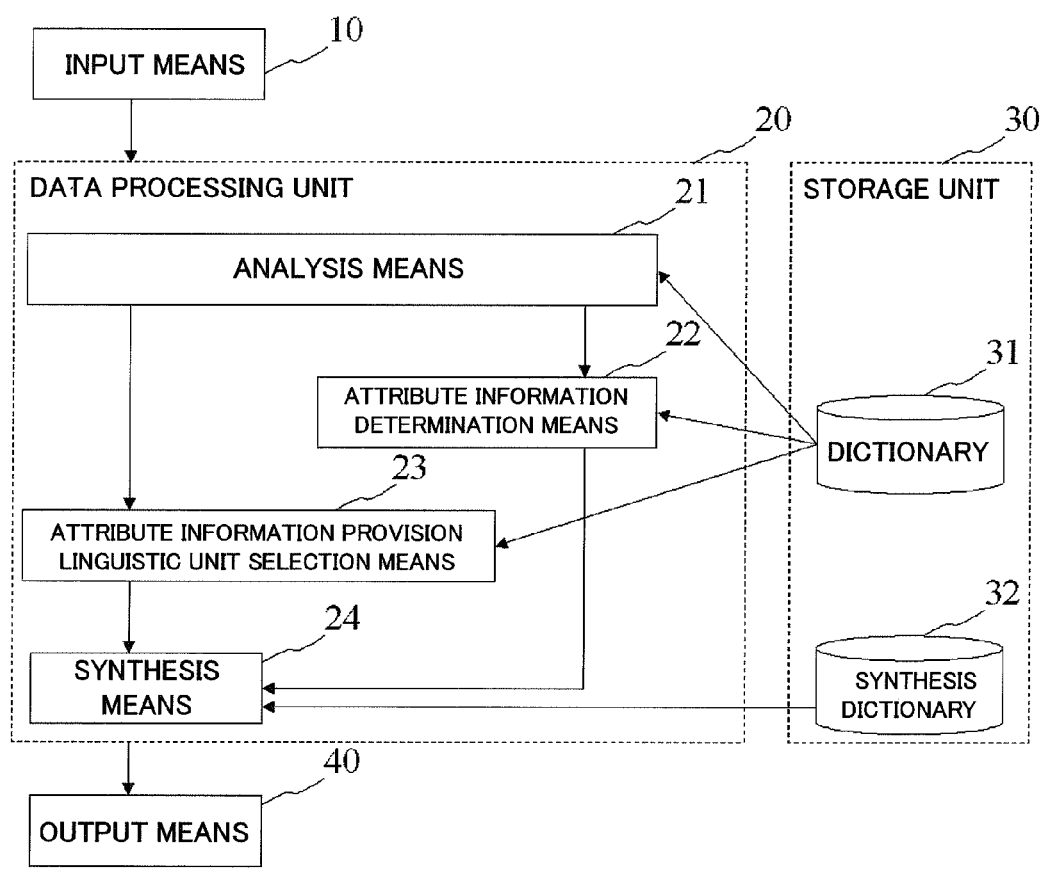
FIG. 1 is a block diagram showing a configuration of a speech synthesis system according to a first exemplary embodiment of the present invention.

EXPLANATIONS OF SYMBOLS 10 input means
20 data processing unit
21 analysis means
22 attribute information determination means
23 attribute information provision linguistic unit selection means
24 synthesis means
25 representation provision means
30 storage unit
31 dictionary
32 synthesis dictionary
33 representation dictionary
40 output means

PREFERRED MODES FOR CARRYING OUT THE INVENTION

Next, preferred modes for carrying out the present invention will be described in detail with reference to drawings.

FIG. 1 is a block diagram showing a configuration of a speech synthesis system according to a first exemplary embodiment of the present invention. Referring to FIG. 1, the speech synthesis system according to this exemplary embodiment is formed of input means 10 such as a keyboard or a microphone, a data processing unit 20 that operates according to program control, a storage unit 30 that stores information therein, and output means 40 such as a display device or a loudspeaker.

The input means 10 is provided for receiving a passage and for receiving an instruction when selection by an operator is necessary.

The data processing unit 20 includes analysis means 21, attribute information determination means (first attribute information determination means) 22, attribute information provision linguistic unit selection means (second attribute information determination means) 23, and synthesis means 24.

The analysis means 21 executes morphological element analysis and syntactic analysis on a passage by referring to a dictionary 31.

The attribute information determination means (first attribute information determination means) 22 extracts a vocabulary that determines attribute information from results of analyses by the analysis means 21 by referring to the dictionary 31, and determines the attribute information to be provided.

The attribute information provision linguistic unit selection means (second attribute information determination means) 23 analyzes a connecting relationship between linguistic units by referring to the results of analyses by the analysis means 21 and the dictionary 31, and also determines a linguistic unit to which the attribute information is to be additionally provided, based on the attribute information determined by the attribute information determination means (first attribute information determination means) 22 and the connecting relationship between the linguistic units.

The synthesis means 24 outputs information necessary for reciting the passage by a synthesized voice, by referring to output results of the attribute information determination means (first attribute information determination means) 22 and the attribute information provision linguistic unit selection means (second attribute information determination means) 23 and a synthesis dictionary 32.

The storage unit 30 includes a dictionary 31 and a synthesis dictionary 32 for a voice synthesis process by the synthesis means 24.

Information such as entries and readings corresponding to the entries, word classes, and examples of actual use of the entries is registered in the dictionary 31.

Information such as a rhythm necessary for reciting the passage by the synthesis voice is registered in the synthesis dictionary 32, associated with the attribute information or the like.

The output means 40 is provided for displaying the input passage on a screen or outputting the input passage in the form of a speech, using a result output by the data processing unit 20.

Next, an overall operation in this exemplary embodiment will be described in detail, with reference to FIG. 1 and a flowchart in FIG. 2.

Figure 2:
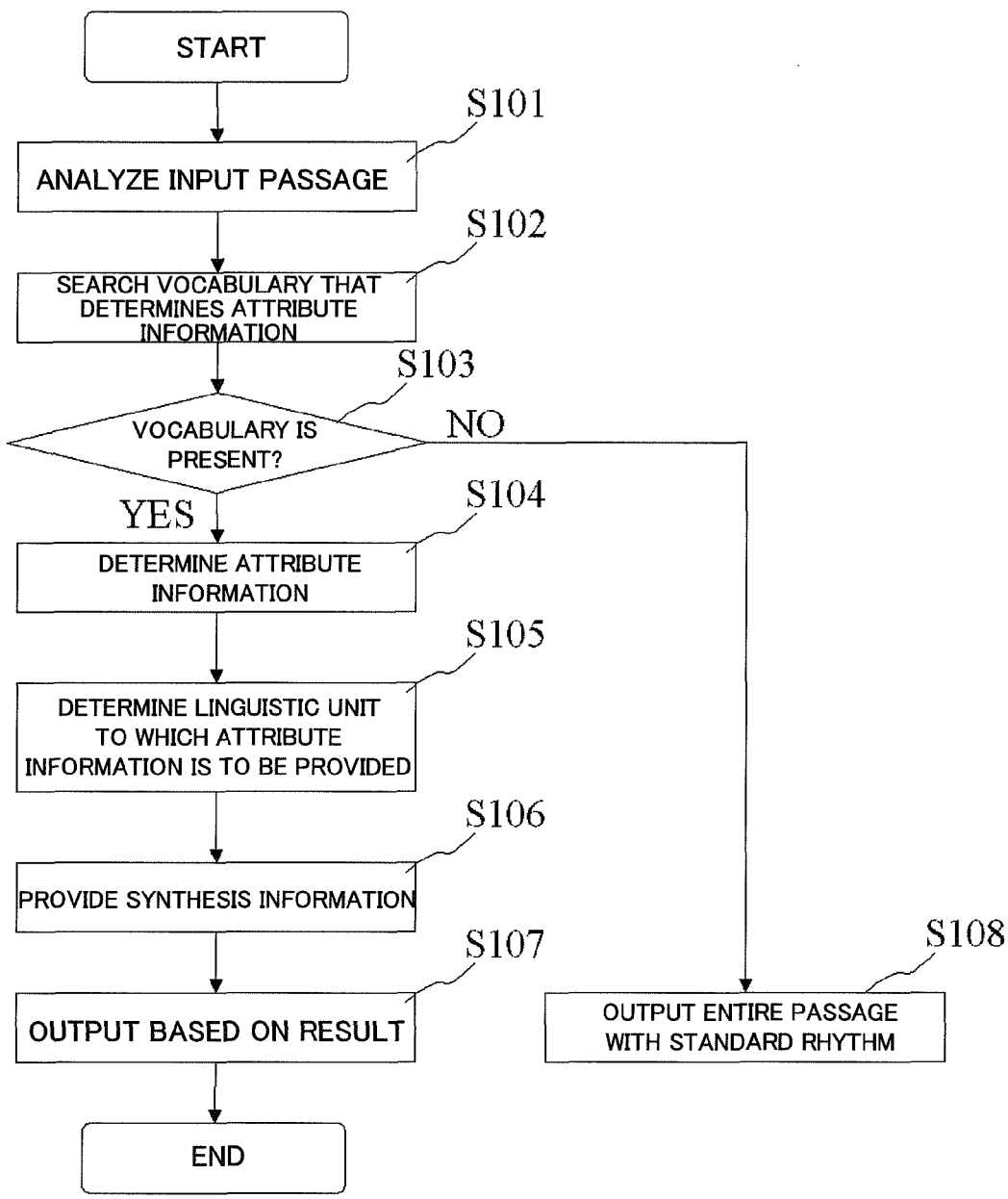
FIG. 2 is a flowchart showing an operation of the speech synthesis system according to the first exemplary embodiment of the present invention.

When a passage is input through the input means 10, the analysis means 21 executes the morphological and syntactic analyses on the passage, by referring to the dictionary 31 (in step S101 in FIG. 2).

Next, the attribute information determination means (first attribute information determination means) 22 searches whether or not there is a vocabulary that determines attribute information among results of the analyses, by referring to the dictionary 31 (in step S102 in FIG. 2). When no vocabulary that determines the attribute information is found (NO in step S103 in FIG. 2), the synthesis means 24 refers to the synthesis dictionary 32 to provide a standard rhythm to the entire passage, and outputs a synthesized speech to the output means 40 (in step S108 in FIG. 2).

On the other hand, when a vocabulary that determines attribute information is extracted in step S103 in FIG. 2, the attribute information determination means (first attribute information determination means) 22 determines attribute information to be provided (in step S104 in FIG. 2).

When determination of the attribute information by the attribute information determination (first attribute information determination means) 22 is completed, the attribute information provision linguistic unit selection means (second attribute information determination means) 23 analyzes a connecting relationship between linguistic units by referring to the results of the analyses by the analysis means 21 and the dictionary 31. Further, the attribute information provision linguistic unit selection means (second attribute information determination means) 23 determines a linguistic unit to which the attribute information is to be additionally provided, based on the attribute information determined by the attribute information determination means (first attribute information determination means) 22 and the connecting relationship between the linguistic units (in step S105 in FIG. 2).

When additional provision of the attribute information by the attribute information provision linguistic unit selection means (second attribute information determination means) 23 is completed, the synthesis means 24 provides to the passage a rhythm corresponding to the attribute information by referring to the synthesis dictionary 32 (in step S106 in FIG. 2).

Finally, the output means 40 outputs the passage to which the rhythm has been provided, by a synthesized voice (in step S107 in FIG. 2).

As described above, in the first exemplary embodiment of the present invention, the attribute information determination means (first attribute information determination means) 22 determines attribute information in a passage. Then, the attribute information provision linguistic unit selection means (second attribute information determination means) 23 further determines a linguistic unit to which each of the attribute information is to be provided. Accordingly, an emotional flow and an intended speech style at a time of creating the passage can be reflected.

Next, a second exemplary embodiment of the present invention will be described in detail with reference to drawings. In the second exemplary embodiment, the first exemplary embodiment described above is modified, and a display mode of a text is altered, thereby expressing the attribute information.

Figure 3:
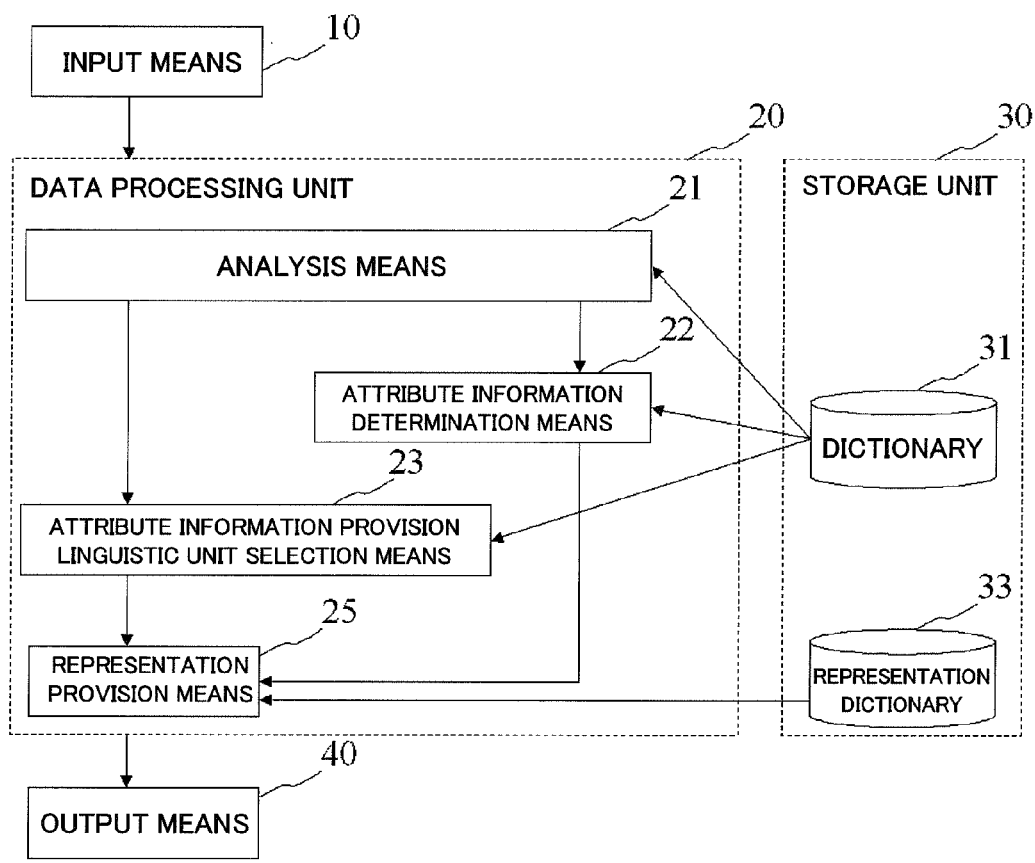
FIG. 3 is a block diagram showing a configuration of a text display system according to a second exemplary embodiment of the present invention.

FIG. 3 is a block diagram showing a configuration of a text display system according to the second exemplary embodiment of the present invention. Referring to FIG. 3, a difference from the first exemplary embodiment described above is that, in place of the synthesis dictionary 32 and the synthesis means 24 in the first exemplary embodiment, the second exemplary embodiment includes a representation dictionary 33 and representation provision means 25.

The representation provision means 25 provides representation such as font information or an icon to be provided, by referring to output results of the attribute information determination means (first attribute information determination means) 22 and the attribute information provision linguistic unit selection means (second attribute information determination means) 23 and the representation dictionary 33.

In the representation dictionary 33, fonts, or icons such as symbols, figures, and pictographs, etc., are registered, associated with attribute information.

Next, an overall operation of this exemplary embodiment will be described in detail, with reference to FIG. 3 and a flowchart in FIG. 4.

Figure 4:
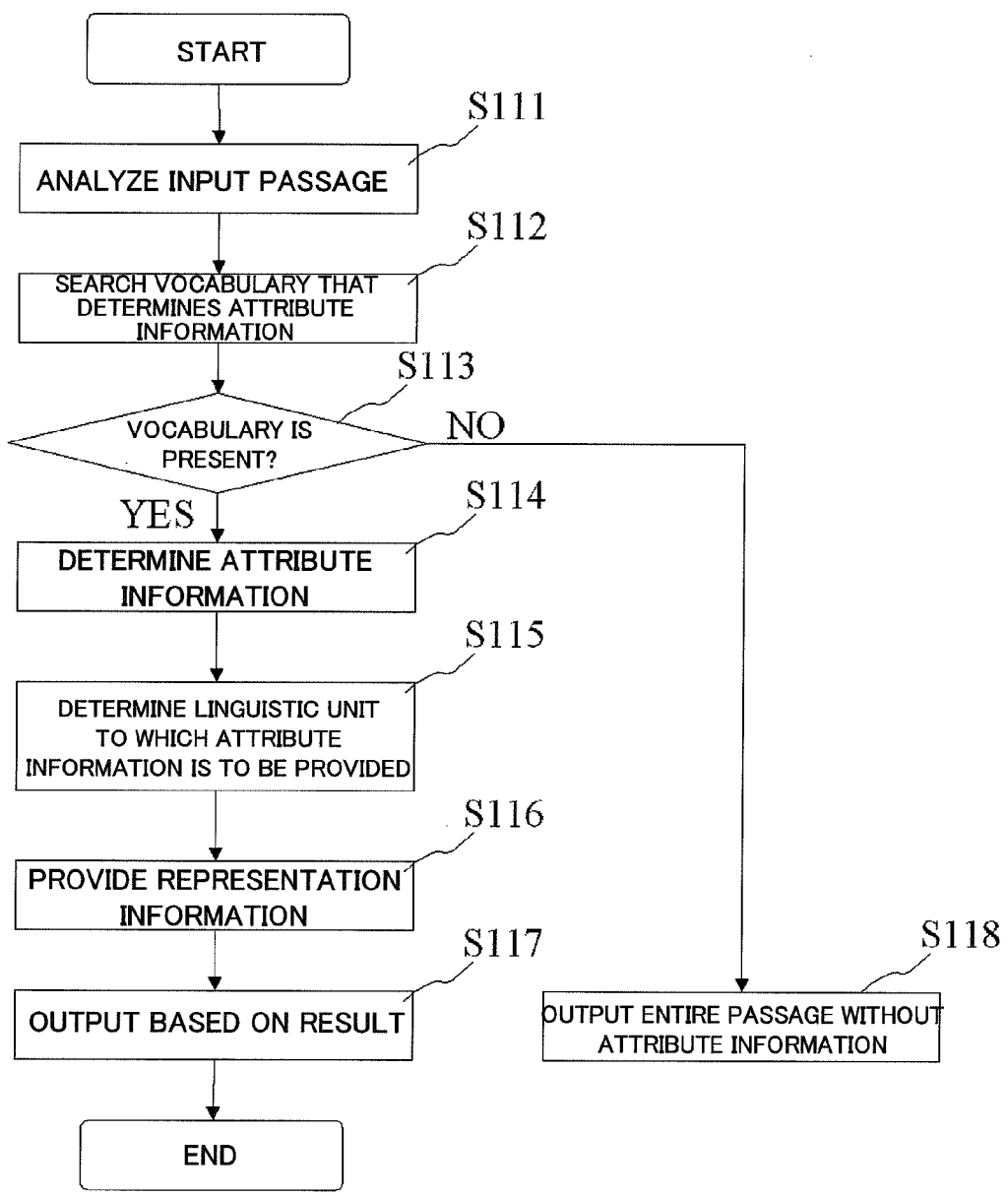
FIG. 4 is a flowchart showing an operation of the text display system according to the second exemplary embodiment of the present invention.

Since operations shown from step S111 to step S115 in FIG. 4 are the same as those in steps S101 to S105 in FIG. 2 in the first exemplary embodiment, description of these steps will be omitted.

First, when no vocabulary that determines attribute information is not extracted in step S113 in FIG. 4 (No in step S113 in FIG. 4), the attribute information is not provided, and an entire passage is output without the attribute information (in step S118 in FIG. 4).

On the other hand, when a vocabulary that determines attribute information is extracted in step S113 in FIG. 4, and additional provision of the attribute information by the attribute information provision linguistic unit selection means (second attribute information determination means) 23 is completed, the representation provision means 25 provides to the passage a specified font or an icon corresponding to the attribute information, by referring to the representation dictionary 33 (in step S116 in FIG. 4).

In case an icon is provided, it is preferable that with regard to the position at which the icon is to be provided, an operator may select one of "providing icon at the beginning and the end of a linguistic unit to which the attribute information has been provided" and "providing icon only at the beginning of the linguistic unit to which the attribute information has been provided" in advance.

Finally, the output means 40 displays the passage with the font or icon provided thereto on the screen (in step S117 in FIG. 4).

As described above, in the second exemplary embodiment of the present invention, even in an environment where speech output may not (is not allowed to) be performed, attribute information on a passage can be represented. Further, in this exemplary embodiment, the synthesis dictionary 32 with a large capacity does not need to be provided. The capacity of the storage unit can be thereby reduced.

EXAMPLES

Next, in order to more specifically describe the above-mentioned exemplary embodiments of the present invention, a first example of the present invention will be described with reference to drawings.

First Example

The first example of the present invention corresponds to the first exemplary embodiment of the present invention described above. The first example is implemented by a configuration including a keyboard as input means 10, a personal computer as data processing means 20, a magnetic disk as storage means 30, and a loud speaker as output means 40.

In addition to a dictionary 31 and a synthesis dictionary 32, the magnetic disk holds a computer program that causes the personal computer (central processing unit) to function as analysis means 21, attribute information determination means (first attribute information determination means) 22, attribute information provision linguistic unit selection means (second attribute information determination means) 23, and synthesis means 24.

When a linguistic expression is supplied from the input means 10, the analysis means 21 executes morphological and syntactic analyses by referring to the dictionary 31, thereby dividing the linguistic expression into a plurality of 1 to n linguistic units. In this example, the linguistic expression refers to any expression expressed by a language. In this example, the linguistic unit refers to a unit such as a paragraph, a clause, a chapter, or a sentence that constitutes a passage, a unit such as a word, a clause, or a phrase that constitutes the sentence, and each of a plurality of sentences that constitute a newspaper or WEB page. Since techniques for the analyses are known techniques, description of the techniques for the analyses will be omitted.

The attribute information determination means (first attribute information determination means) 22 searches whether or not a vocabulary that determines attribute information is included in the 1 to n linguistic units, by referring to the dictionary 31. In this example, the attribute information refers to an emotion such as delight, anger, sorrow, or pleasure or a speech style such as a recitation style or a DJ style. The vocabulary includes a face character (face mark), a symbol, or a formula. The formula includes a fixed expression such as a proverb, as well.

FIG. 5 shows examples of correspondences between vocabularies and attribute information included in the dictionary 31. Referring to FIG. 5, when a vocabulary of "I'm glad" is extracted from one of the 1 to n linguistic units, the attribute information on the one linguistic unit is determined as "joy".

The attribute information provision linguistic unit selection means (second attribute information determination means) 23 determines whether or not the attribute information on any one linguistic unit determined by the attribute information determination means (first attribute information determination means) 22 is to be provided to a linguistic unit adjacent to the one linguistic unit. When the vocabulary of "I'm glad" is extracted from a dth lingustic unit, and the attribute information on the dth linguistic unit is determined as "joy", the attribute information provision linguistic unit selection means 23 iteratively determines whether the attribute information is to be provided to a (d−1)th linguistic unit or a (d+1)th linguistic unit.

The attribute information provision linguistic unit selection means 23 refers to results of the analyses by the analysis means 21 and the dictionary 31, and then analyzes a relationship (connecting relationship) between one linguistic unit and an adjacent linguistic unit aforementioned using a vocabulary included in the one linguistic unit. Then, the attribute information provision linguistic unit selection means 23 determines whether or not the attribute information is additionally provided to the adjacent linguistic unit, based on a result of the analysis. The analysis of the relationship (connecting relationship) between the one linguistic unit and the adjacent linguistic unit is made, using a vocabulary for linguistic unit connection such as a conjunction or a conjunctive-particle included in at least one of the adjacent linguistic units, correspondence of a reference term included in each adjacent linguistic unit, association between words, a theme change, a change in a sentence-end expression, or the like.

FIG. 6 is a table for explaining a concept when analysis is made on a relationship (connecting relationship) between linguistic units of "sentences" segmented from a passage constituted from a plurality of sentences as a linguistic expression.

The relationship (connecting relationship) between linguistic units may be broadly classified into the following four types:
(1) The linguistic units are related to each other.
(2) The linguistic units are not related to each other.
(3) An adjacent sentence (linguistic unit) is an independent sentence (linguistic unit).
(4) Another attribute information is (has been) determined for an adjacent sentence (linguistic unit).

The above-mentioned connecting relationship types (1) to (4) will be described in detail with reference to FIG. 6, accompanying with examples.

(1) The Linguistic Units are Related to Each Other.

When the theme or the tone of adjacent sentences is not changed between the adjacent sentences and a reason description or a supplemental description is given, for example, it means that the sentences are related to each other.

Among vocabularies used when it is determined that the theme is not changed are conjunctions and conjunctive-particles. For example, a causal conjunction such as "so" or "accordingly", an additive conjunction such as "further" or "moreover", a conjunction indicating parallelism such as "or" or "and", a conjunction indicating explanation or supplementation such as "that is" or "because", and a conjunction indicating illustration such as "for example" at the beginning of a sentence, and a conjunctive-particle indicating a reason such as "NODE (since . . . )", "KARA (because . . . )" at the end of a sentence may be pointed out as the vocabularies used when it is determined that the theme is not changed.

A range including a reference term such as "this" or "that" corresponds to a matter that has occurred before the reference term should be analyzed as the (1) type where the sentences are related to each other. Sentences such as "Thank you for sending me a sweater. Since I have wanted that sweater for a long time, I'm very glad" may be pointed out as an example of the sentences that are related to each other. The corresponding range of a reference term described above may extend over a plurality of linguistic units.

A range where a matter described before may be recognized to be omitted such as omission of a subject should also be analyzed as the (1) type where the sentences are related to each other, though the range is omitted in FIG. 6. Sentences such as "We are also really astonished. Did not expect such a thing would happen." may be pointed out as an example of the sentences that are related to each other.

Further, a range where there is an association between words should be analyzed as the (1) type where the sentences are related to each other. The range where there is the association between the words is a range where the same word is repeatedly used, a range where words with similar meanings, such as words of "buy" and "purchase", are used, or a range where words with a strong association, such as words of "school bag" and "elementary school pupil" are used.

Further, a range where the theme remains unchanged should be analyzed as the (1) type where the sentences are related to each other. Even if the theme is changed as in a passage of "I will introduce a new friend. His name is Taro Suzuki. He comes from Hokkaido", for example, the "name" and the "birthplace" are matters that accompany the "person (friend)". Thus, consistency of the theme may be recognized.

Further, based on knowledge that reason and background are often described before or after the vocabulary which determines attribute information, it is also possible to define an attribute information provision rule, and then to collectively set attribute information based on a position relative to a sentence including the vocabulary which determines the attribute information, rather than making determination as to the attribute information of the adjacent sentence one after another (iteratively). As the attribute information provision rule, "providing same attribute information to three sentences before or after a sentence including the vocabulary that determines attribute information", "regarding adjacent sentences as being related to each other as long as a conjunction indicating changeover or an adversative conjunction does not appear" or "regarding adjacent sentences as being related to each other until a sentence having another attribute information appears" may be conceived.

As described above, when the connecting relationship of being related to each other in the (1) type is recognized between adjacent sentences, same attribute information should be provided to the adjacent sentences. The attribute information which is the same as that of one of the adjacent sentences (linguistic units) (attribute information that has been already determined) is provided to the other of the adjacent sentences (linguistic units).

(2) The Linguistic Units are Not Related to Each Other.

When the theme or the tone of adjacent sentences is changed between the adjacent sentences, for example, it means that the adjacent sentences are not related to each other.

Among vocabularies used when it is determined that the theme has been changed are conjunctions. A conjunction indicating changeover such as "by the way" or "now", an adversative conjunction such as "but" or "however", and a conjunction indicating contrast or selection such as "or" or "alternatively" at the beginning of a sentence may be pointed out as the vocabularies used when it is determined that the theme has been changed.

It was mentioned before that, in case the subject was omitted in adjacent sentences, the sentences were in the (1) type connecting relationship of being related to each other. On the contrary, when the theme is changed between adjacent sentences, it should be analyzed in principle that the adjacent sentences are in the (2) type connecting relationship of not being related to each other.

When the tone of adjacent sentences has been changed, it should be analyzed in principle that the adjacent sentences are in the (2) type connecting relationship of not being related to each other. A change of the tone of the sentences notably appears in a sentence-end expression. A change of a sentence-end particle or an auxiliary verb has been made as in a passage of "It was fun. See you again." and a change of a type of a sentence such as an interrogative sentence, a declarative sentence, or an imperative sentence, for example, may be pointed out as the notable changes in the tone of the sentences. However, an influence level of this change in the sentence-end expression is smaller than other factor for determining the connecting relationship between adjacent sentences. When the theme between adjacent sentences remains unchanged even if a sentence-end expression is changed, it is often the case where the adjacent sentences are in the (1) type connecting relationship of being related to each other.

As described above, when the (2) type connecting relationship of not being related to each other is recognized between adjacent sentences, attribute information which is the same as that on a preceding sentence (linguistic unit) should not be provided to a following sentence. Attribute information on the following sentence (linguistic unit) should be determined based on a connecting relationship with a subsequent sentence (linguistic unit) and attribute information that first appears in a subsequent stage.

(3) An Adjacent Sentence (Linguistic Unit) is an Independent Sentence (Linguistic Unit).

A greeting sentence or a quoted portion of an electronic mail starting from ">" should be analyzed as the (3) type connecting relationship of being an independent sentence (linguistic unit). The greeting sentence or the quoted portion may be determined from results of the analyses, presence of a quotation mark, or a layout of an overall passage.

The rhythm of a greeting sentence such as "Good Morning" and "Thank you for your usual cooperation", for example, is often provided in the synthesis dictionary 32. Thus, when a following sentence is in the (3) type connecting relationship of being an independent sentence (linguistic unit) and is also the greeting sentence, as described above, the rhythm of the greeting sentence may be utilize and output without alteration. Further, it is enough for the quoted portion as well to be recited with a standard rhythm. As described above, when the following sentence is in the (3) type connecting relationship of being an independent sentence (linguistic unit), it is not necessary to adapt the following sentence to attribute information on the adjacent sentence (linguistic unit).

(4) Another Attribute Information is (has been) Determined for an Adjacent Sentence (Linguistic Unit).

When another attribute information is determined for each of adjacent sentences (linguistic units), the attribute information of each of the sentences (linguistic units) should be held without being mutually influenced by the attribute information. Sentences such as "I was sad. I've got angry" may be pointed out as an example of the sentences where another attribute information is determined owing to each of adjacent sentences, though the theme and the tone of the adjacent sentences remain unchanged.

When the synthesis dictionary 32 is referred to and then no vocabulary that determines attribute information is extracted in a passage by the attribute information determination means (first attribute information determination means) 22, the synthesis means 24 provides the standard rhythm with no attribute information to the entire passage, thereby generating a synthesized voice. Then, the synthesis means 24 outputs the generated synthesized voice to the output means 40. When attribute information on a passage is determined by the attribute information determination means (first attribute information determination means) 22, and then when a sentence range with each attribute information provided thereto is determined by the attribute information provision linguistic unit selection means (second attribute information determination means) 23, the synthesis means 24 provides a rhythm corresponding to the determined attribute information, thereby generating a synthesized voice. Then, the synthesis means 24 outputs the generated synthesized voice to the output means 40.

An operation of this example configured as described above will be described in detail using correspondence examples between vocabularies and attribute information in FIG. 5 and illustrative sentences in FIG. 7.

It is assumed that as shown in FIG. 7, a passage of "Good morning~! Now, the train has stopped. A fatal train accident has occurred. I'm quite upset, I will be late again (-_-✗). By the way, how was the last test? I've passed (ˆoˆ)." has been supplied through the input means 10.

FIG. 8 shows an example where the above-mentioned passage has been divided into six sentences (linguistic units) by the analysis means 21 activated on the personal computer.

The attribute information determination means (first attribute information determination means) 22 activated on the personal computer refers to the dictionary 31, thereby searching whether or not a vocabulary that determines attribute information is included in the six sentences described above. Referring to FIG. 5, marks "!" and "(ˆoˆ)" are associated with attribute information of "joy", and "I'm upset" and a mark "(-_-✗)" are associated with attribute information of "anger". Thus, the attribute information determination means (first attribute information determination means) 22 determines attribute information on a first sentence as "joy", determines attribute information on a fourth sentence as "anger", and determines attribute information on a sixth sentence as "joy".

Then, the attribute information is provided by the attribute information provision linguistic unit selection means (second attribute information determination means) 23 activated on the personal computer.

First, the attribute information provision linguistic unit selection means (second attribute information determination means) 23 determines whether or not to provide the attribute information of "joy" on the first sentence to a second sentence as well. The first sentence is, however, a greeting sentence of "Good morning." (which is an independent sentence in the (3) connecting relationship). Thus, the standard rhythm is determined to be used for the first sentence. Then, the attribute information of "joy" is discarded, and the attribute information is not provided to the second sentence, either.

Next, the attribute information provision linguistic unit selection means (second attribute information determination means) 23 determines whether or not to provide the attribute information of "anger" on the fourth sentence to third and fifth sentences as well. With respect to the fourth and fifth sentences, the fifth sentence starts with the conjunction of "by the way", which indicates changeover. It is therefore determined that a change of theme has been made in the fifth sentence (which indicates the (2) type connecting relationship of not being related to each other). Then, the attribute information provision linguistic unit selection means 23 does not provide the attribute information of "anger" to the fifth sentence. On the other hand, with respect to the third and fourth sentences, the third sentence has no vocabulary from which it is determined that a change of theme has been made from the fourth sentence or the tone of the sentence has changed from the fourth sentence. Further, no vocabulary that determines attribute information different from "anger" is present, either (which indicates the (1) type connecting relationship), the same attribute information of "anger" on the fourth sentence is provided to the third sentence.

Next, the attribute information provision linguistic unit selection means (second attribute information determination means) 23 determines whether or not to provide the attribute information of "anger" on the third sentence to the second sentence as well. With respect to the second and third sentences, the second sentence has no vocabulary from which it is determined a change of theme has been made from the third sentence or the tone of the sentence has changed from the third sentence. Further, no vocabulary that determines attribute information different from "anger" is present, either (which indicates the (1) type connecting relationship), the same attribute information of "anger" on the third sentence is provided to the second sentence.

Finally, the attribute information provision linguistic unit selection means (second attribute information determination means) 23 determines whether or not to provide the attribute information of "joy" on the sixth sentence to the fifth sentence as well. In the fifth and sixth sentences, there is an association between words of "pass" and "test". Thus, it is determined that the same attribute information is to be provided (which indicates the (1) type connecting relationship). Then, the attribute information of "joy" is provided to the fifth sentence as well.

FIG. 10 shows a state where the attribute information has been provided to the adjacent sentences (linguistic units) by the attribute information provision linguistic unit selection means (second attribute information determination means) 23, from a state in FIG. 9.

The synthesis means 24 activated on the personal computer refers to the synthesis dictionary 32, and provides the rhythm to each of the sentences with the attribute information in FIG. 10. Then, the input passage is finally recited by the input means 40, as follows.

"Good morning~!" . . . recited with the standard rhythm

"Now, the train has stopped. A fatal train accident has occurred. I'm quite upset, I will be late again (-_-✕ )." . . . recited with the rhythm indicating anger "By the way, how was the last test? I've passed (ˆo ˆ)." . . . recited with the rhythm indicating joy FIG. 11 shows an output result when the attribute information has been provided for each sentence, by a speech synthesis system in Patent Document 2. In this case, the input passage is recited as follows.

"Good morning~!" . . . recited with joy

"Now, the train has stopped." . . . recited with no attribute information

"A fatal train accident has occurred." . . . recited with no attribute information "I'm quite upset, I will be late again (-_-✕ )." . . . recited with a rhythm indicating anger "By the way, how was the last test?" . . . recited with no attribute information "I've passed (ˆo ˆ)." . . . recited with a rhythm indicating joy As described above, a sentence range to which the attribute information has been provided differs between this example and the conventional art (Patent Document 2). In the conventional art (Patent Document 2), emotions of a talker in the sentences (of the second, third, and fifth sentences) which include no vocabulary that specifies the attribute information cannot be expressed. Thus, when the passage is recited serially, the way of speaking is in such a manner that an emotional change frequently occurs during the speech. On contrast therewith, this example performs a process of providing to a sentence not including a vocabulary that specifies attribute information as well the attribute information on an adjacent (foregoing/following) sentence, as necessary. Thus, an emotional transition can be expressed, and the way of speaking that does not cause a listener of the speech to feel uncomfortable can be realized.

The above description was made using examples of providing attribute information on emotions. The present invention is effective also when attribute information on a speech style is provided. An example where the attribute information on the speech style has been provided will be described below.

It is assumed herein that attribute information on a "DJ style" is associated with a vocabulary of "Let's~!." It is assumed further that an input passage is composed of sentences of "Hello, everybody. I'm Hanako in charge of the lesson. Today's lesson is about "be" verbs. Now, let's start today's lesson!"

In this case, the analysis means 21 divides the input passage into four sentences of ""Hello, everybody.", "I'm Hanako in charge of the lesson.", "Today's lesson is about "be" verbs.", "Now, let's start today's lesson!"

Then, the attribute information determination means (first attribute information determination means) 22 extracts from a fourth sentence the vocabulary of "Let's~!", which determines the attribute information, and determines the attribute information on the fourth sentence as the "DJ style".

Then, the attribute information provision linguistic unit selection means (second attribute information determination means) 23 determines whether or not to provide the attribute information of the "DJ style" to a third sentence as well. In the third and fourth sentences, a word "lesson" is repeatedly used. Thus, it is determined to provide the same attribute information. Then, the attribute information of the "DJ style" is provided to the third sentence as well.

Next, the attribute information provision linguistic unit selection means (second attribute information determination means) 23 determines whether or not to provide the attribute information of the "DJ style" to a second sentence as well. In the second and third sentences as well, the word "lesson" is repeatedly used. Thus, it is determined to provide the same attribute information. Then, the attribute information of the "DJ style" is provided to the second sentence as well.

Finally, the attribute information provision linguistic unit selection means (second attribute information determination means) 23 determines whether or not to provide the attribute information of the "DJ style" in the second sentence to a first sentence as well. The first sentence, however, is a greeting sentence. Accordingly, the standard rhythm is used for the first sentence, and the attribute information is not provided to the first sentence.

As a result, the input passage is finally recited by the output means 40, as follows.

"Hello, everybody." . . . recited with the standard rhythm

"I'm Hanako in charge of the lesson. Today's lesson is about "be" verbs. Now, let's start today's lesson!" . . . recited with the DJ style On the other hand, when the speech synthesis system in Patent Document 2 is used, the above-mentioned passage is recited as follows:

"Hello, everybody." . . . recited with no attribute information

"I'm Hanako in charge of the lesson." . . . recited with no attribute information "Today's lesson is about "be" verbs." . . . recited with no attribute information "Now, let's start today's lesson!" . . . recited with the DJ style As described above, when the attribute information on the speech style is provided as well, this example performs the process of providing to a sentence not including a vocabulary that specifies attribute information as well the attribute information on an adjacent sentence, as necessary. Thus, the way of speaking that does not cause a listener of the speech to feel uncomfortable can be realized.

Second Example

Next, a second example corresponding to the second exemplary embodiment of the present invention described above will be described with reference to drawings. A difference between this example and the first example described above is that, in place of the synthesis means 24, representation provision means 25 is included, and a representation dictionary 33 is stored in a magnetic disk as the storage means 30, in place of the synthesis dictionary 32, and further, a display is used as the output means 40.

An operation of the second example will be described below with matters already described in the first example omitted, as necessary. Operations where an input passage is analyzed, attribute information with respect to each sentence is determined, and further a sentence (linguistic unit) range to which the attribute information is to be provided is determined based on connecting relationships of sentences are the same as those in the first example. Accordingly, description of the operations will be omitted.

When the attribute information and the sentence range to which the attribute information is to be provided are determined, the representation provision means 25 activated on the personal computer provides representation information corresponding to the attribute information, by referring to the representation dictionary 33. Herein, the representation information in a system selected in advance by an operator from among changes in font, display of icons such as symbols, figures, and pictographs, and the like, stored in the representation dictionary 33, associated with attribute information, is provided.

Herein, an example of performing representation corresponding to the attribute information based on a change of font will be taken and then described. FIG. 12 shows correspondence examples between attribute information and representation information included in the representation dictionary 33.

A description will be given below, assuming that the passage of "Good morning~! Now, the train has stopped. A fatal train accident has occurred. I'm quite upset, I will be late again (-_-メ). By the way, how was the last test? I've passed (^o^)." shown in FIG. 7 in the first example has been supplied.

Operations where the above-mentioned passage is divided into the six sentences, the attribute information with respect to each sentence is determined, and the sentence range to which the attribute information is to be provided is determined are the same as those in the first example. Up to this stage, the attribute information is provided to the input passage, as follows.

"Good morning~!" . . . recited with the standard rhythm

"Now, the train has stopped. A fatal train accident has occurred. I'm quite upset, I will be late again (-_-メ)." . . . recited with the rhythm indicating anger "By the way, how was the last test? I've passed (^o^)." . . . recited with the rhythm indicating joy The representation provision means 25 provides information necessary for representing results of providing the attribute information using changes in font, by referring to the representation dictionary 33.

That is, the attribute information of "joy" is associated with a "pop style". The attribute information of "anger" is associated with a "Gothic style". Accordingly, each of the above-mentioned illustrative sentences is represented by a font corresponding to the attribute information, as shown in FIG. 13, and is output to the output means 40.

Alternatively, icon display may be selected as the representation information. With respect to a position to which an icon is to be provided in this case, it is preferable that selection may be made between provision of the icon at the beginning and the end of a linguistic unit to which the attribute information has been provided, as shown in FIG. 14 and provision of the ion only at the beginning of a linguistic unit to which the attribute information has been provided, as shown in FIG. 15.

The above description has been given about the preferred exemplary embodiments of the present invention. Further, information on the intensity (weak or strong) of an attribute may also be added to attribute information provided by the attribute information provision linguistic unit selection means (second attribute information determination means) 23. As a method of adding the intensity, one of the following methods may be adopted:

(1) a method of adding the intensity according to the strength of the vocabulary that determines the attribute information;

(2) a method of adding the intensity according to the strength of a linkage between adjacent linguistic units; and (3) a method of adding the intensity by following a rule set by the operator In the case of the method (1) of adding the intensity according to the strength of the vocabulary that determines the attribute information, when the vocabulary that directly represents an emotion, such as "was (were) angry", is employed, three sentences composed of a sentence including the vocabulary that determines the attribute information and adjacent (foregoing/following) sentences to the sentence including the vocabulary are emphasized. When the vocabulary that indirectly represents an emotion, such as "couldn't put up with", is employed, only a sentence (linguistic unit) including the vocabulary that determines the attribute information is emphasized. The intensity may be thereby added. Differentiation may be made such that a sentence (linguistic unit) where a plurality of vocabularies that determine attribute information is emphasized two times more than a sentence (linguistic unit) including only one vocabulary that determines attribute information.

In the case of the method (2) of adding the intensity according to the strength of a linkage between adjacent linguistic units, the intensity may be added based on a result of analysis on a connecting relationship between linguistic units used when determining a sentence range to which attribute information is provided. For example, sentences linked by a conjunction of "therefore" are analyzed to be strongly linked, while sentences linked by correspondence of a reference term are analyzed to be weakly linked.

In the case of the method (3) of adding the intensity by following the rule set by the operator according to content of an input passage or the like, the intensity may be added according to the rule based on a position from the vocabulary that determines attribute information. For example, the intensity may be added to "only the vocabulary that determines attribute information", "one sentence including the vocabulary that determines attribute information", or "three sentences composed of a sentence including the vocabulary that determines attribute information and adjacent sentences to the sentence including the vocabulary".

When any of the above-mentioned methods (1) to (3) is adopted, emphasizing levels may also be set in stages. When the strength of a sentence including the vocabulary that determines attribute information is set to 10, the strength of an immediately adjacent sentence may be set to 5, and the strength of a sentence adjacent to the immediately adjacent sentence may be set to 3, for example. The intensity levels may be set in multiple stages, as described above.

An example of adding the intensity to the passage of "Now, the train has stopped. A fatal train accident has occurred. I'm quite upset, I will be late again (-_-×)." in FIG. 7 using the method (3) of adding the intensity by following the rule set by the operator will be presented.

When the operator has set the rule that emphasizes the "sentence including the vocabulary that determines attribute information", attribute information of "anger" that is stronger than in the first half of the passage of "Now, the train has stopped. A fatal train accident has occurred." is provided to the latter half of the passage of "I'm quite upset, I will be late again (-_-×)." The latter half of the passage is therefore recited strongly, or is represented by an emphasizing font or an emphasizing icon.

It is preferable that the above-mentioned process of "adding the intensity" be of course set to an option for the process of providing attribute information and the operator may selectively set the above-mentioned process of "adding the intensity" in advance.

The above description has been given about the preferred exemplary embodiments for carrying out the present invention. The present invention is not limited to the description about these exemplary embodiments. Various variations may be applied within a range not departing from the gist of the present invention of including additional attribute information determination means for providing attribute information determined based on a dictionary to other linguistic unit. In the exemplary embodiments described above, for example, description was given, citing examples where the present invention has been applied to the speech synthesis system and the text display system. The present invention may be applied to other application system as well.

Each element disclosed in each exemplary embodiment and each example described above is only a preferred example, and it goes without saying that various variations may be applied within a range not departing from the gist of the present invention.

INDUSTRIAL APPLICABILITY

As described above, the present invention may be applied to applications such as a speech synthesis system that represents attribute information on an emotion or a speech style included in a passage by sounds and a program for causing a computer to implement functions of the speech synthesis system. The present invention may also be applied to various text output systems such as a device including display means for visually representing the attribute information and a device for transmitting/receiving a passage.

In the following, preferred modes are further summarized.

In the program, the connecting relationship between the respective linguistic units may be determined, based on whether or not a vocabulary for linguistic unit connection registered in the dictionary is included in adjacent ones of the linguistic units. (Mode P1)

In the program, attribute information that defines at least one of an emotion and a speech style may be provided as the attribute information. (Mode P2)

In the program, the attribute information divided into any one of linguistic units of word, clause, phrase, sentence, paragraph, subsection, section, and chapter may be determined. (Mode P3)

In the program, the attribute information on each of the adjacent ones of the linguistic units may be determined, based on at least one of correspondence of a reference term included in each of the linguistic units, association between words, a theme change, and a change in a sentence-end expression. (Mode P4)

In the program, when a configuration of a sentence or a vocabulary included in each of the linguistic units satisfies a predetermined condition, the attribute information provided to a corresponding one of the linguistic units may be deleted. (Mode P5)

In the program, by iteratively executing determination of the attribute information on a linguistic unit adjacent to the linguistic unit on which the attribute information has been determined, based on the connecting relationship between the respective linguistic units and the attribute information already provided, attribute information on the linguistic unit with no attribute information provided thereto may be determined. (Mode P6)

In the program, the attribute information on the linguistic units in a predetermined range with respect to a linguistic unit on which the attribute information has been determined by the first attribute information determination means may be collectively determined. (Mode P7)

The invention claimed is:
1. An information provision system comprising:
an analysis unit that divides a linguistic expression into predetermined linguistic units using a dictionary;
a first attribute information determination unit that extracts a predetermined vocabulary from the linguistic units and determines attribute information on a first linguistic unit, among the linguistic units included in the linguistic expression, using the dictionary; and
a second attribute information determination unit that determines a second linguistic unit to which the attribute information is to be further provided, from among remaining ones of the linguistic units with no attribute information provided thereto except the first linguistic unit with the attribute information provided thereto by said first attribute information determination unit, and the attribute information to be provided to the second linguistic unit being based on a connecting relationship between the respective linguistic units and the attribute information provided by said first attribute information determination unit, wherein said information provision system provides the attribute information to the linguistic expression on a linguistic unit level, and wherein said second attribute information determination unit determines the connecting relationship between the respective linguistic units, based on whether or not a vocabulary for linguistic unit connection registered in the dictionary is included in adjacent ones of the linguistic units.

2. The information provision system according to claim 1, wherein information that defines at least one of an emotion and a speech style is provided as the attribute information.

3. The information provision system according to claim 1, wherein said analysis unit divides the linguistic expression into any one of linguistic units of word, clause, phrase, sentence, paragraph, subsection, section, and chapter.

4. The information provision system according to claim 1, wherein said second attribute information determination unit determines the attribute information on the second linguistic unit with no attribute information provided thereto, based on at least one of correspondence of a reference term included in each of the linguistic units, association between words, a theme change, and a change in a sentence-end expression.

5. The information provision system according to claim 1, wherein
when a configuration of a sentence or a vocabulary included in said each of the linguistic units satisfies a predetermined condition, said second attribute information determination unit deletes the attribute information provided to a corresponding one of the linguistic units.

6. The information provision system according to claim 1, wherein
said second attribute information determination unit collectively determines the attribute information on the linguistic units in a predetermined range with respect to the first linguistic unit on which the attribute information has been determined by said first attribute information determination unit.

7. The information provision system according to claim 1, wherein the attribute information including intensity level information indicating an intensity of an attribute may be provided.

8. A speech synthesis system including the information provision system according to claim 1, comprising:
a synthesis unit that synthesizes speech data, using attribute information on each of the linguistic units determined by the information provision system and a synthesis dictionary that stores therein data for reciting linguistic expression by a synthesized voice corresponding to the attribute information.

9. A text display system including the information provision system according to claim 1, comprising:
a representation provision unit that controls a text display mode for said each of the linguistic units, using attribute information on each of the linguistic units determined by the information provision system and a representation dictionary that stores therein data for displaying the linguistic expression in the mode corresponding to the attribute information.

10. An information provision system comprising:
an analysis unit that divides a linguistic expression into predetermined linguistic units using a dictionary;
a first attribute information determination unit that extracts a predetermined vocabulary from the linguistic units and determines attribute information on a first linguistic unit, among the linguistic units included in the linguistic expression, using the dictionary; and a second attribute information determination unit that determines a second linguistic unit to which the attribute information is to be further provided, from among remaining ones of the linguistic units with no attribute information provided thereto except the first linguistic unit with the attribute information provided thereto by said first attribute information determination unit, and the attribute information to be provided to the second linguistic unit being based on a connecting relationship between the respective linguistic units and the attribute information provided by said first attribute information determination unit, wherein said information provision system provides the attribute information to the linguistic expression on a linguistic unit level, and wherein said second attribute information determination unit iteratively executes determination of the attribute information on an adjacent linguistic unit that is adjacent to the first linguistic unit on which the attribute information has been determined, based on a connecting relationship between the respective linguistic units and attribute information already provided, thereby determining the attribute information on the second linguistic unit with no attribute information provided thereto.

11. A non-transitory computer-readable storage medium having stored thereon a program for performing an information provision method, the method comprising:
dividing a linguistic expression into predetermined linguistic units using a dictionary;
extracting, by a first attribute determination unit, a predetermined vocabulary from the linguistic units and determining attribute information on a first linguistic unit included in the linguistic expression using the dictionary; and
determining a second linguistic unit to which the attribute information is to be further provided, from among remaining ones of the linguistic units with no attribute information provided thereto except the first linguistic unit with the attribute information provided thereto by said first attribute information determination unit, and the attribute information to be provided to the second linguistic unit being based on a connecting relationship between the respective linguistic units and the attribute information provided by said first attribute information determination unit,
wherein the attribute information is provided to the linguistic expression on a linguistic unit level, and
wherein the connecting relationship between the respective linguistic units is determined based on whether or not a vocabulary for linguistic unit connection registered in the dictionary is included in adjacent ones of the linguistic units.

12. An information provision method carried out using an information provision system, the method comprising:
dividing a linguistic expression into predetermined linguistic units using a dictionary;
extracting, by a first attribute information determination unit, a predetermined vocabulary from the linguistic units and determining attribute information on a first linguistic unit included in the linguistic expression using the dictionary; and
determining, by a processor, a second linguistic unit to which the attribute information is to be further provided, from among remaining ones of the linguistic units with no attribute information provided thereto except the first linguistic unit with the attribute information provided thereto by said first attribute information determination unit, and the attribute information to be provided to the second linguistic unit being based on a connecting relationship between the respective linguistic units and the attribute information provided by said first attribute information determination unit, wherein the attribute information is provided to the linguistic expression on a linguistic unit level, and wherein the connecting relationship between the respective linguistic units is determined based on whether or not a vocabulary for linguistic unit connection registered in said dictionary is included in adjacent ones of the linguistic units.

13. The information provision method according to claim 12, wherein said information provision system provides the attribute information that defines at least one of an emotion and a speech style.

14. The information provision method according to claim 12, wherein the linguistic units are one of words, clauses, phrases, sentences, paragraphs, subsections, sections, and chapters.

15. The information provision method according to claim 12, wherein said information provision system determines the attribute information on each of the adjacent ones of the linguistic units, based on at least one of correspondence of a reference term included in each of the linguistic units, association between words, a theme change, and a change in a sentence-end expression.

16. The information provision method according to claim 12, wherein when a configuration of a sentence or a vocabulary included in each of the linguistic units satisfies a predetermined condition, the attribute information provided to a corresponding one of the linguistic units is deleted.

17. The information provision method according to claim 12, wherein said information provision system collectively determines the attribute information on the linguistic units in a predetermined range with respect to the linguistic unit on which attribute information has been determined by said first attribute information determination unit.

18. An information provision method carried out using an information provision system, the method comprising:

dividing a linguistic expression into predetermined linguistic units using a dictionary;

extracting, by a first attribute information determination unit, a predetermined vocabulary from the linguistic units and determining attribute information on a first linguistic unit included in the linguistic expression using the dictionary; and determining, by a processor, a second linguistic unit to which the attribute information is to be further provided, from among remaining ones of the linguistic units with no attribute information provided thereto except the first linguistic unit with the attribute information provided thereto by said first attribute information determination unit, and the attribute information to be provided to the second linguistic unit being based on a connecting relationship between the respective linguistic units and the attribute information provided by said first attribute information determination unit, wherein the attribute information is provided to the linguistic expression on a linguistic unit level, and wherein by iteratively executing determination of the attribute information on an adjacent linguistic unit adjacent to the first linguistic unit on which the attribute information has been determined, based on connecting relationship between the respective linguistic units and the attribute information already provided, the attribute information on the second linguistic unit with no attribute information provided thereto is determined.

* * * * *